| (12) United States Patent | (10) Patent No.: US 10,091,949 B2 |
|---|---|
| Angheloiu et al. | (45) Date of Patent: Oct. 9, 2018 |

(54) COMPACT PATTERN ARRANGEMENTS OF LIVE PLANTS

(71) Applicants: Alexandra A. Angheloiu, Dubois, PA (US); Nicoleta A. Angheloiu, Dubois, PA (US); George O. Angheloiu, Dubois, PA (US)

(72) Inventors: Alexandra A. Angheloiu, Dubois, PA (US); Nicoleta A. Angheloiu, Dubois, PA (US); George O. Angheloiu, Dubois, PA (US)

( * ) Notice: Subject to any disclaimer, the term of this patent is extended or adjusted under 35 U.S.C. 154(b) by 321 days.

(21) Appl. No.: 14/586,191

(22) Filed: Dec. 30, 2014

(65) Prior Publication Data

US 2015/0182041 A1 Jul. 2, 2015

Related U.S. Application Data

(60) Provisional application No. 61/921,997, filed on Dec. 30, 2013.

(51) Int. Cl.
*G09B 25/08* (2006.01)
*A01G 9/00* (2018.01)

(52) U.S. Cl.
CPC ..................... *A01G 9/00* (2013.01)

(58) Field of Classification Search
CPC . A01G 1/00; A01G 1/001; A01G 7/00; A01G 9/006; A01G 9/02; A01G 9/10; A01G 9/102
USPC ............ 434/81, 84, 85, 90, 93, 95, 96; 47/1.01 R, 20.1, 32.3, 33, 56
See application file for complete search history.

(56) References Cited

U.S. PATENT DOCUMENTS

| 1,743,987 | A |   | 1/1930 | Tinaglia |   |
|---|---|---|---|---|---|
| 2,113,523 | A |   | 4/1938 | White |   |
| 2,279,735 | A |   | 4/1942 | Gates |   |
| 2,305,567 | A | * | 12/1942 | Bole | A63H 33/42 33/1 G |
| 2,366,377 | A |   | 1/1945 | Zois |   |
| 2,618,901 | A |   | 11/1952 | Braun |   |
| 3,940,884 | A | * | 3/1976 | Mason, Jr. | A01G 13/0281 47/32 |
| 3,992,812 | A |   | 11/1976 | Horowitz |   |
| 4,583,322 | A |   | 4/1986 | Dimich |   |

(Continued)

FOREIGN PATENT DOCUMENTS

EP 2113166 A1 11/2009

*Primary Examiner* — Kurt Fernstrom

(57) ABSTRACT

This patent regards the design of compact (unitary structures, implantable by themselves, residing non-deployed in small kits, able to be deployed by a single individual, and able to create identifiable meaningful sign by themselves) arrangements of live plants, plant-alike or plant-replacement materials, seedling or seeds by organized pattern seeding of plants or seeds or planting of seedlings of flowers and plants in the soil, or arrangements of plant-replacement or plant-alike material to render small scale plant pattern-designed arrangements in small areas around houses or businesses. To reach this purpose, plants, seeds or seedlings, plant-alike or plant-replacement materials will be planted, raised, arranged and/or cut in a single or multilayer fashioned compact object of good visual resolution translating into a meaningful message of pictorial, geometrical, linguistic, or various other meaningful nature.

16 Claims, 14 Drawing Sheets

(56) References Cited

U.S. PATENT DOCUMENTS

| | | | |
|---|---|---|---|
| 4,600,612 A * | 7/1986 | Litwin | A41G 1/00 156/63 |
| 4,606,950 A | 8/1986 | Corbet | |
| 4,679,350 A * | 7/1987 | Banta | A01G 13/0231 47/17 |
| 4,891,251 A * | 1/1990 | Fletcher | B44C 5/06 156/63 |
| 5,063,708 A * | 11/1991 | Smith | A01G 13/0256 47/33 |
| 5,453,308 A * | 9/1995 | Myers | A41G 1/00 156/63 |
| 5,588,253 A | 12/1996 | Boodley et al. | |
| 5,853,827 A * | 12/1998 | Wise | A01G 5/04 248/27.8 |
| 6,134,834 A | 10/2000 | Ripley, Sr. et al. | |
| 6,286,251 B1 | 9/2001 | Whitson | |
| 6,604,319 B2 | 8/2003 | Whitson | |
| 6,763,601 B1 * | 7/2004 | Turley | A01G 1/00 33/1 G |
| 7,013,602 B2 | 3/2006 | Weder et al. | |
| RE39,379 E * | 11/2006 | Wechsler | 119/256 |
| 7,562,492 B2 * | 7/2009 | Mueller | A01G 5/04 47/41.12 |
| 8,033,049 B2 | 10/2011 | St. Clair et al. | |
| 8,091,324 B2 | 1/2012 | Weder | |
| 8,151,516 B1 * | 4/2012 | Harshman | A01G 5/04 47/41.01 |
| 8,312,673 B2 | 11/2012 | Benfey et al. | |
| 8,745,918 B2 * | 6/2014 | Dyson-Coope | A01G 1/00 33/566 |
| 9,313,957 B2 * | 4/2016 | Wargo | A01G 5/04 |
| 2003/0061722 A1 * | 4/2003 | Bradley | E04G 21/18 33/563 |
| 2004/0200142 A1 | 10/2004 | Ito | |
| 2005/0074728 A1 * | 4/2005 | Dark | A01G 5/04 434/93 |
| 2006/0191196 A1 | 8/2006 | Cochran | |
| 2008/0209804 A1 * | 9/2008 | Stradiot | A01G 31/001 47/64 |
| 2011/0219689 A1 | 9/2011 | Hodson-Walker | |
| 2011/0283614 A1 | 11/2011 | Jaensch | |

* cited by examiner

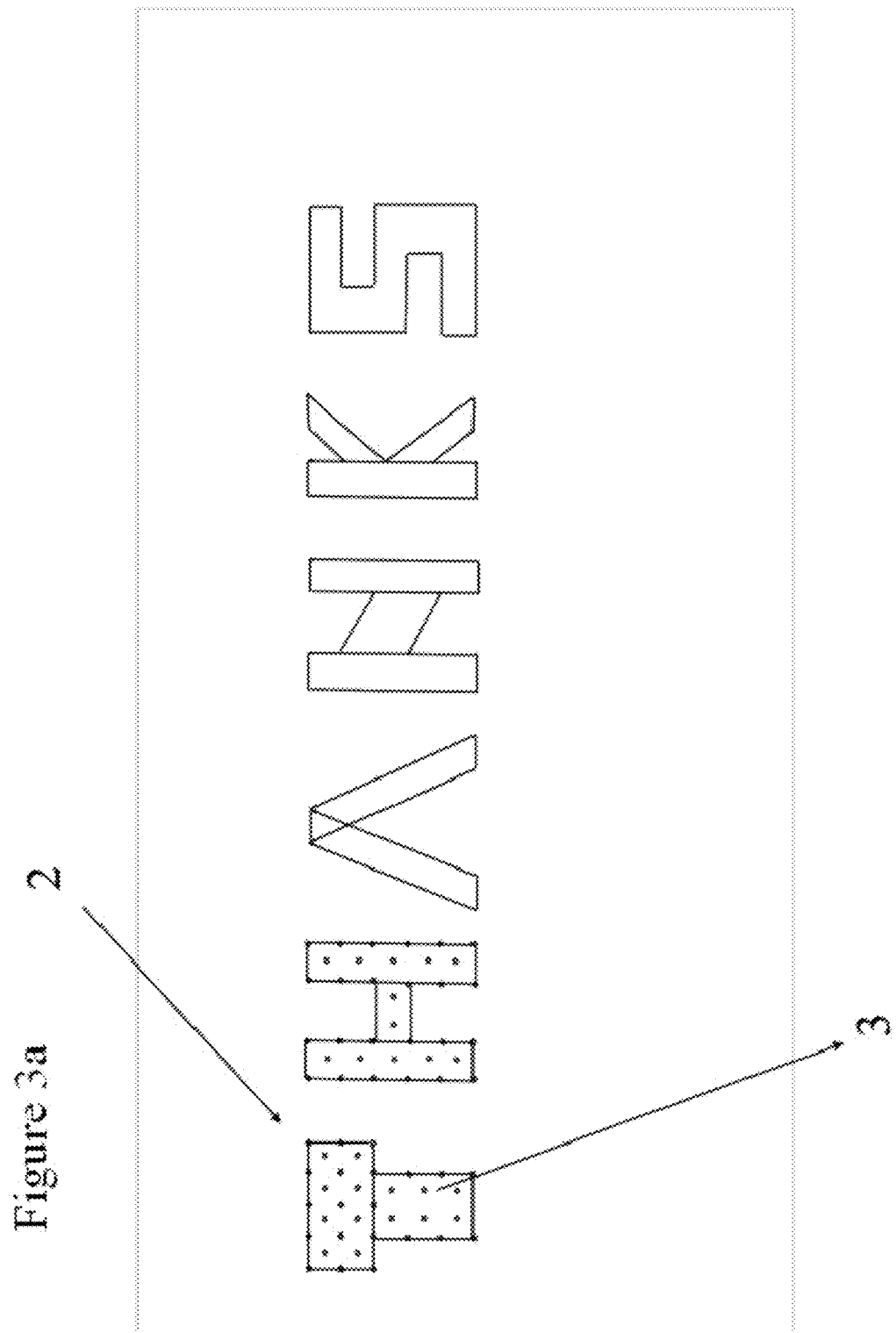

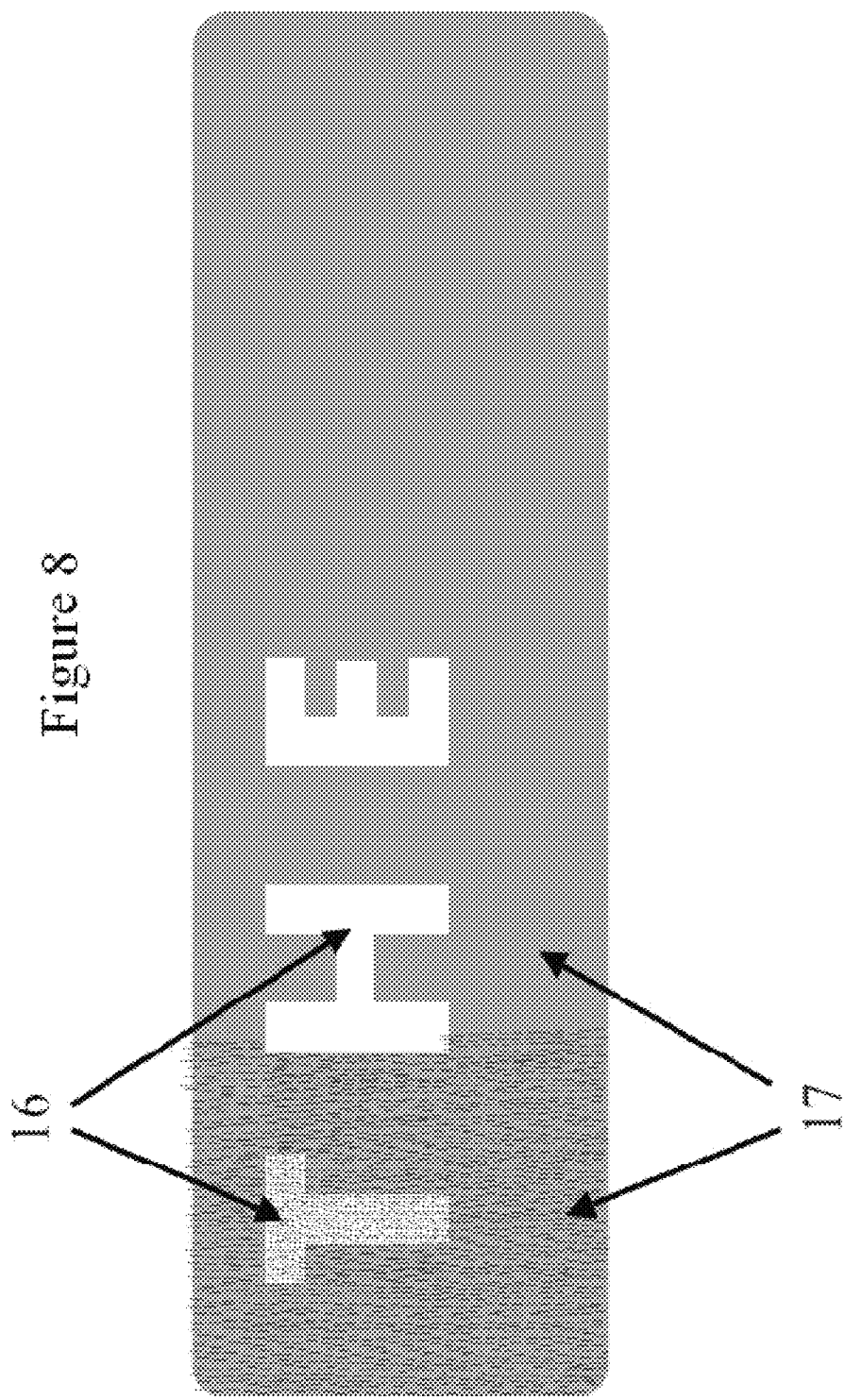

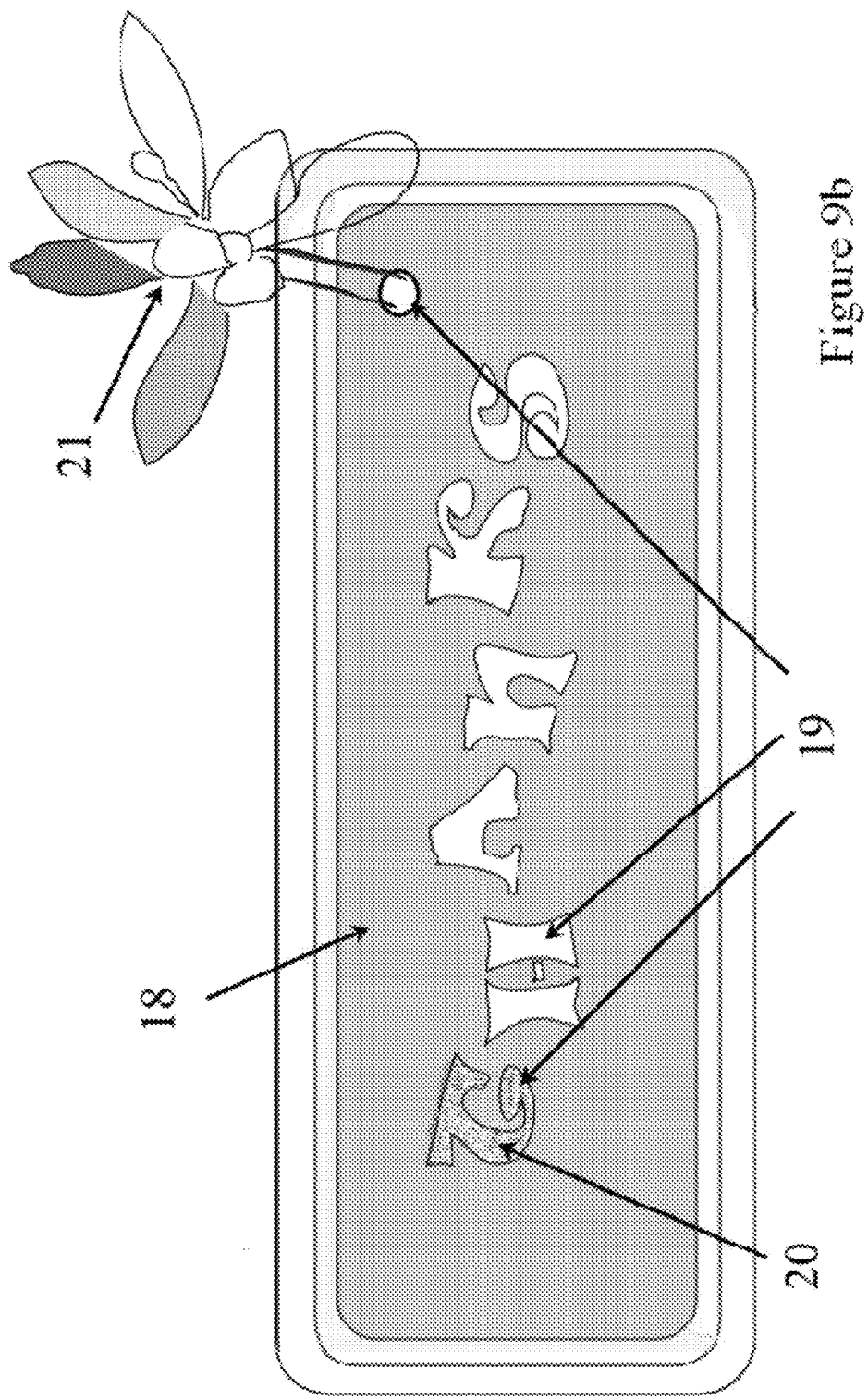

COMPACT PATTERN ARRANGEMENTS OF LIVE PLANTS

CROSS-REFERENCE TO RELATED APPLICATIONS

This patent application claims the benefit of U.S. Provisional Patent Application No. 61/921,997, filed Dec. 30, 2013, which is incorporated by reference.

TECHNICAL FIELD

This patent application pertains to arrangements of live plants, plant-like or plant-replacement material, and, more specifically, to a compact arrangement of the same by organized pattern seeding or planting.

BACKGROUND OF THE INVENTION

Live plant or flower patterns can be created on a large scale by means of a plurality of live plants organized in a plurality of modules that can be arranged in a large assembly, as shown, for example in U.S. Pat. No. 8,033,049 to St. Clair et al. However, one needs multiple modules to build a pattern that suggests a meaningful sign. Also the area used by this type of pattern is large, so the person building is not concerned about issues with resolution of this design, since one will look at it from a large distance. Thus, St. Clair et al. teaches a base with upstanding walls between the modules, in order to create stability for the network of modules used by this particular patent.

U.S. Pat. No. 1,743,987 to Tinaglia described a receptacle having one or more inner walls used to separate plants. The inner walls suggesting an astronomical, numerical or alphabetical symbol.

In EP 2113166A1 to Fazio, the author uses a frame situated between a pot and the soil in order to assist in removal of the entire soil mass surrounding the roots of the plant living in the pot. The object of Fazio is to extract the roots in their entirety without damaging them. The container is not supposed to maintain the structure or shape of the soil surrounding the roots.

Cut flower arrangements disclosed in U.S. Pat. No. 2,366,377 to Zois, and U.S. Pat. No. 4,066,950 to Corbet are designed to generate three-dimensional architectural structures with a certain shape (such as a cross), however, the system cannot generate an infinite number of shapes with meaningful sense (such as linguistic or numerical, geographical, etc).

These references, however, are not directed to the assembly of live plants, seedlings, seeds or plant-alike or plant-replacement objects in small areas, suitable for use in pots or small lots of land around private homes or business. Using small areas to arrange flowers and plants in a pattern suggesting linguistic, geometric, pictorial, numerical, symbolical or astrological signs, or depicting a logo needs clear demarcation of borders between the various shapes and colors of the pattern with good visual resolution and a compact nature for easy handling; that is, they are not directed to the provision of a unitary structure, implantable by itself, residing non-deployed in a small kit, able to be deployed by a single individual, and able to create an identifiable meaningful sign by itself.

SUMMARY OF THE INVENTION

For the purposes of our disclosure, the terms "flo-pat" or "grass-pat" will be used interchangeably to refer to a compact arrangement of live plants by organized pattern seeding, planting or arrangements of seeds, seedlings, adult live plants, plant-alike or plant-replacement objects to create live floral or plant symbolic patterns of adequate individual resolution for planting in small areas.

Also this disclosure addresses the creation of compact units of designs made of live plants, or plant-alike or plant-replacement material that will be deployed by themselves and represent by themselves a meaningful sign. In our disclosure we demonstrate the use on non-floral material with the specific purpose of increasing the visual resolution, as related to the use of small compact plant designs.

The disclosed methods and arrangements differ from the prior art. In order to create the compact nature of our small pattern design, one may need a thin tri-dimensional network situated inside the flo-pat, different than the inter-modular structures used by St. Clair et al. While Tinaglia suggests a receptacle design, the method and object of interest in this disclosure teaches how to create a multitude of floral live patterns or designs of plant-alike and plant-replacements of plants that can function independently. In opposition, our method teaches how to build a theoretically infinite multitude of pattern flower designs made of a multitude of materials, without necessarily requiring a receptacle. Unlike Fazio, the method and structure of this disclosure utilizes a three-dimensional network that is supposed maintain the shape of the flo-pat, and it extends for this reason through the soil structure.

BRIEF DESCRIPTION OF THE SEVERAL VIEWS OF THE DRAWING(S)

FIGS. 3a and 3b show two patterns of screens allowing passage of two types of seeds that will deposit into the corresponding orifices of the solid template.

FIG. 8 illustrates the results of a flo-pat using a "cutting sheet" by leaving areas of plants uncut of greater height than in areas where plants where allowed to pass through the sheet's perforations and subsequently cut above the sheet by a cutting instrument.

FIG. 9b is a "mask" creating a design pattern by allowing only plants under the orifices made in the mask to be visible. Small orifices (in this particular picture—the round orifice) are perforated or made in the "mask" by various means, allowing only the roots and stems of plants to be inserted into the orifices and then in the holes made in the soil situated right under the "mask" orifices.

DETAILED DESCRIPTION OF THE INVENTION

Figure 1:
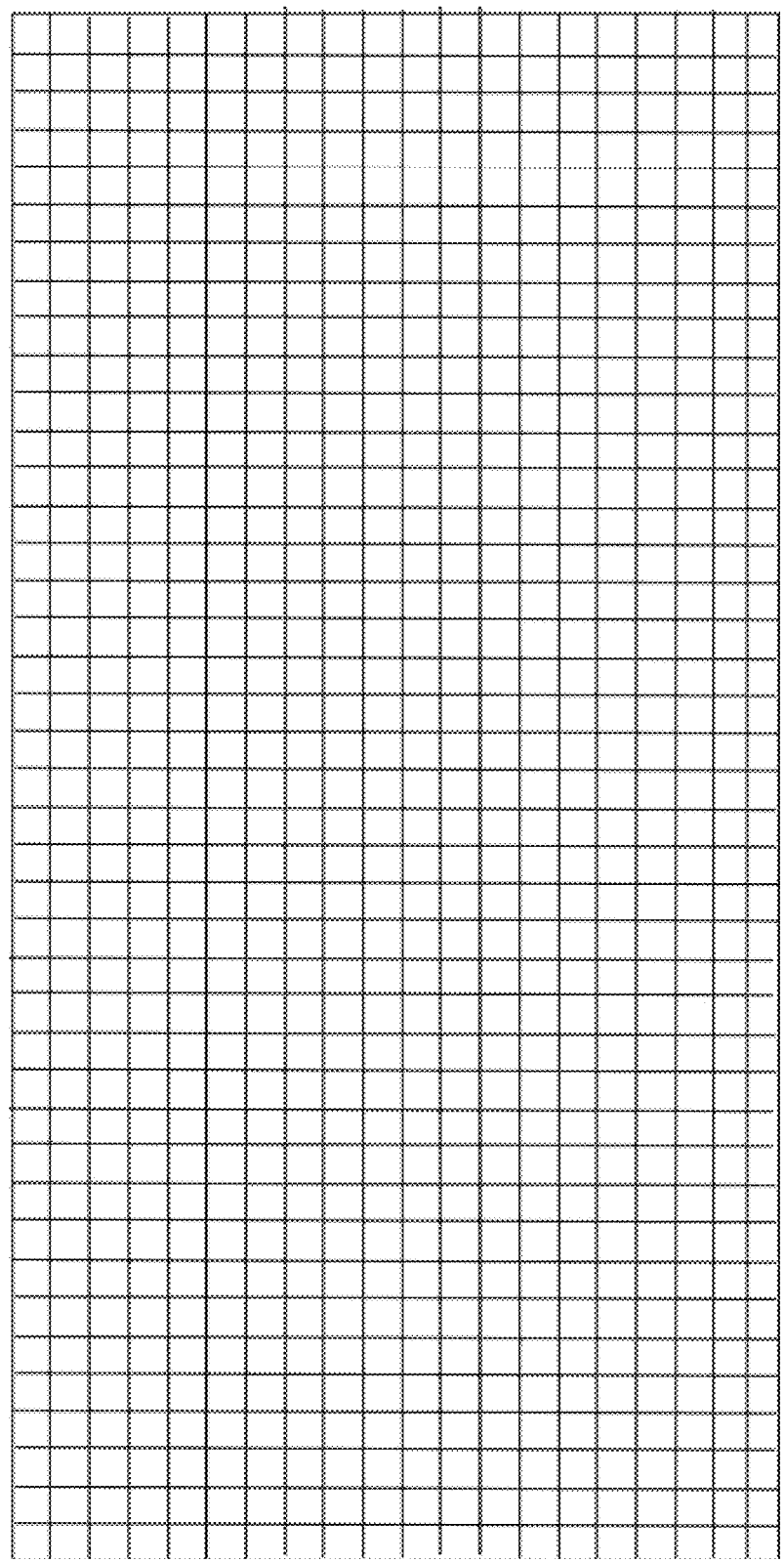
FIG. 1 is a "solid template"—a grid with small orifices, which allow seeds or plants to be arranged according to a pre-set pattern according to a flo-pat or grass-pat pattern.

For the current disclosure, the following definitions will be utilized:

Solid template—a solid grid that bears seeds, plants, seedlings or planting objects in a meaningful pattern;

Screen method—method to drop seeds in a meaningful pattern though the perforations of a screen;

Planting object—objects made of medium that offer plant sustenance and include seeds that later on will develop into plants, and are shaped into shapes representing meaningful signs;

Cookie tray—holds the planting object, in order to help maintain the latter's object shape, prior to the latter being manipulated and implanted in the soil;

Mask—a surface made a various durable materials, used with the purpose of covering empty areas or plants not intended to be seen in the flo-pat and increase the visual resolution of the flo-pat or grass-pat;

Cutting sheet—a sheet made of preferably thin pliable plastic material, with empty spaces allowing only segments of an uniform blanket of plants to penetrate to the surface of the sheet; these plants will be cut subsequently at the level of the sheet, with the remaining plants sticking at a higher level, creating in this way a meaningful design.

Similarly, a "shade sheet" will have various degrees of transparency, creating a patterned design of plants of various degrees of color density according to how much light reaches the plants.

The current disclosure establishes a method to create clearly demarcated (of good visual resolution) compact object areas of same or various color and/or shape, texture or height in a pattern made of live plants, seeds or seedlings, or plant-alike (such as artificial grass or flowers, or any type of material resembling a plant by shape or color) or plant-replacement material (such as mulch, rocks, soil etc) and non-biological materials such as plastic, sponge, metal, wood, paint, textiles, glass, fiberglass, or any type of material that would create a supporting/artistic structure. These qualities will help create a better visual resolution for floral/plant pattern arrangements in small areas such as pots, or in arrangements in small outside areas such as residential yards and in small areas relating to businesses in urban areas. At the same time, these objects will be compact, enjoying a unitary structure, being implantable by themselves, residing non-deployed in a small kit, able to be deployed by a single individual, and able to create an identifiable meaningful sign by itself.

Towards this end, a multilayer structure includes the following biological and non-biological materials in various embodiments:

1) First layer is represented by the seeds, live plants, or seedlings, or, alternatively, plant-alike or plant-replacement materials planted in the ground or pot soil in the various modalities as detailed below, in compact small objects of acceptable visual resolution. The biological or replacement entities will be planted or installed in particularly small units or modules that will allow an acceptable visual resolution of the pattern through small size and a fine demarcation of the edges of each particular pattern area. Optionally, pots or containers may have a sliding bottom that can be slid from under the pot after the pot has been situated on the ground in order for the plants to continue to spread roots into the ground below the pot/container.

2) The second layer is made of surfaces either of biological material (shoots plants of greater height of the same or different color/shape/variety) or non-biological materials mentioned above that will be clearly demarcating the limits of the plant group from paragraph 1).

3) A repetition of the 1) followed by 2) layers can follow, using the latter layer as support or height reference. In this way the pattern can achieve a tri-dimensional structure that will better enhance the design.

The flo-pats/grass-pats can be built, transported or manipulated by themselves or they can be incorporated into larger structures, such as flower pots, trays, etc, and built, transported, manipulated or sold as such.

Figure 11:
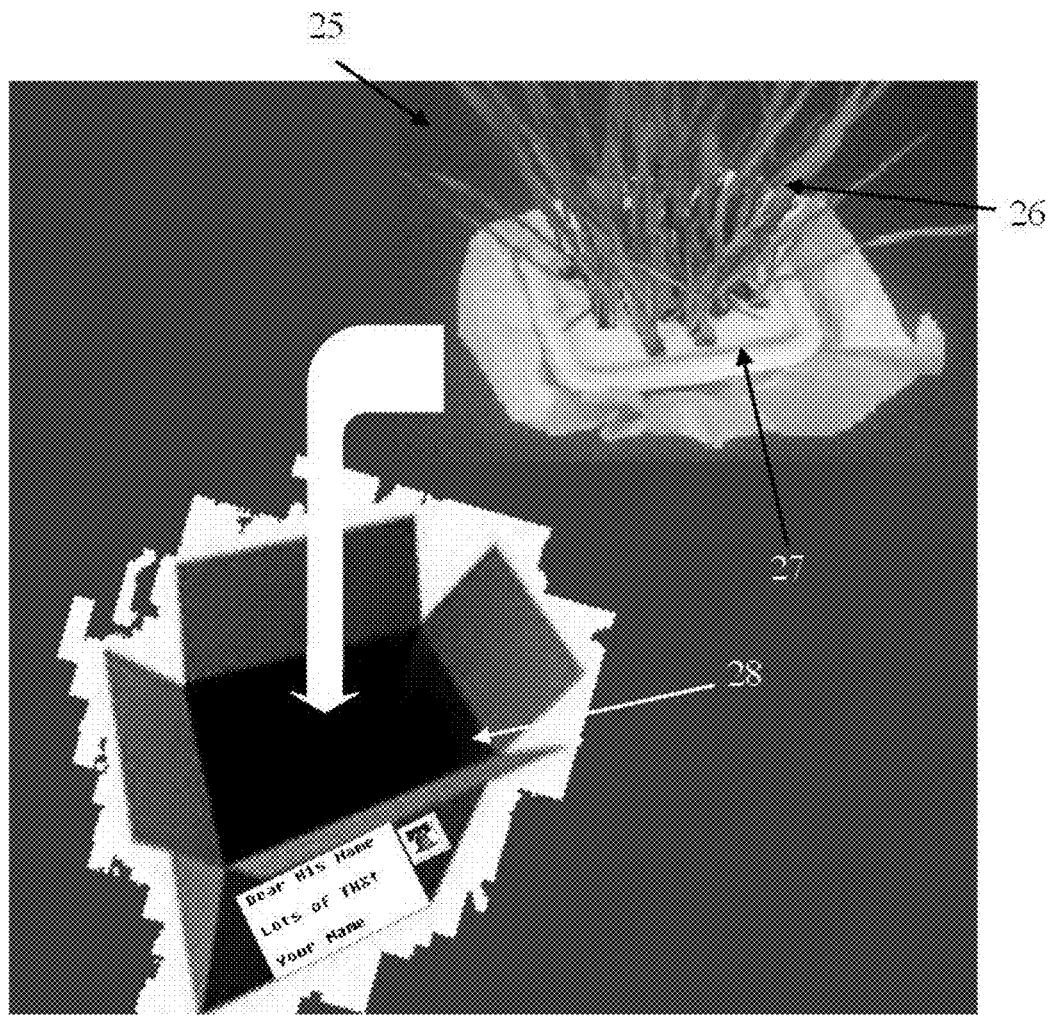
FIG. 11 is an isometric view of an exemplary horticultural design kit according to at least one embodiment of the invention.

Referring to FIG. 11, there is illustrated an exemplary horticultural design kit according to at least one embodiment of the invention. The kit 25 includes a plurality of live plants, plant-replacement materials, seedlings, or seeds 26 disposed in an organized pattern in a framework 27 that maintains the relative disposition of the same for planting. The framework 27 may be, for example, soil within a container, a plantable cloth that generally maintains the relative positioning, one or more solid templates or screens that control dispositions of seeds or seedlings, or a shade screen which controls the rate of growth of plants. The organized pattern is of reasonable visual resolution allowing its use in small areas such as pots or house yards or around businesses in small urban areas. The kit is compact, and the pattern of plants, plant-replacement materials, seedlings, or seeds is able to be implanted by itself, resides in a small singular kit until deployment, is able to be deployed by a single individual, and is able to create an identifiable meaningful sign by itself. As shown in FIG. 11, the kit 25 may be contained within packaging 28, and may include labeling or instructions.

1. Structure of First Layer

First layer will be represented by the seeds, live plants, or seedling planted in the ground or pot soil in the various modalities as detailed below. The biological entities, plant-alike or plant-replacement materials (mulch, rocks, soil, etc) will be planted or arranged in particularly small units or modules that will allow an acceptable visual resolution of the pattern through a fine demarcation of the edges of each particular pattern area.

These biological or non-biological materials are planted in a compact pattern of particularly small size that would allow to create a design or picture of acceptable visual resolution with a meaning, that being a word or a sequence of words, a picture or any images that may bear a symbolic, language, astrological, geometrical or pictorial connotation.

The seeds or seedlings/plants could be planted in garden, pots or any other container in a horizontal or vertical orientation, outside or indoors, and in any indoor location using natural or artificial light, using any type of watering or feeding system. Also in the indoor or outdoor location the flo-pats can be arranged horizontally in a normal orientation or up-side down, provided that the pots where the flo-pats are located will be firmly affixed to a support that can hold them in this particular position, such as ceiling, post, etc. At the same time the flo-pats/grass-pats can be arranged in a water environment with the pattern visibly displayed to the viewer such as on the side or bottom of the pond or on the glass side-wall or bottom of a fish-tank. The flo-pat or grass-pat can be attached with suckers on the glass wall of a fish tank with plants displayed either to the viewer's or fishes' side or even both at the same time with plants growing from opposite sides of the flo-pat/grass-pat pot.

Figure 2:
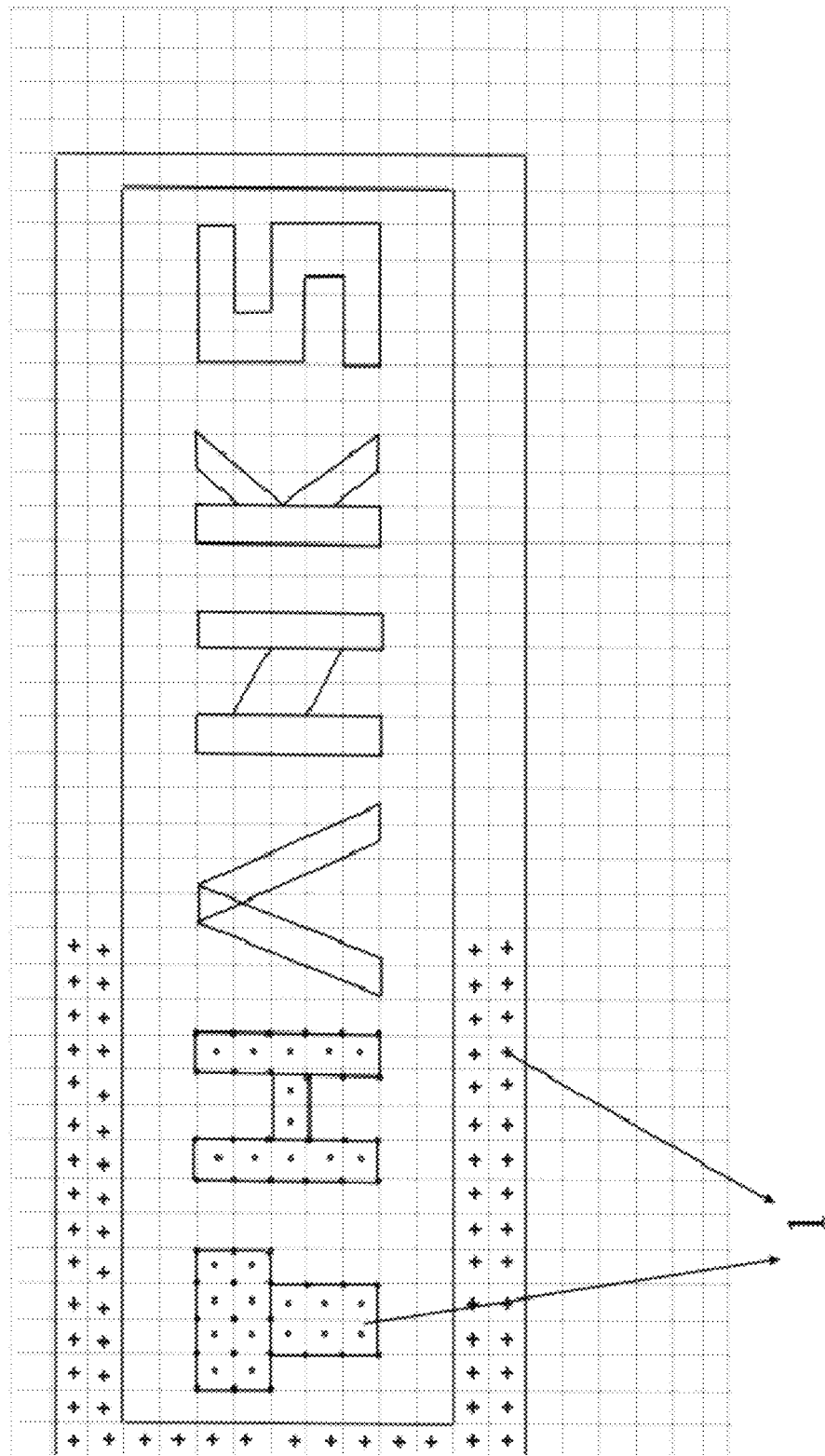
FIG. 2 is a flo-pat or grass-pat pattern being applied to a solid template grid. There are two types of signs (dot and cross), indicating the sub-patterns of the flo-pat/grass-pat, each of them including a different type of seed.

Only as an example one can write a word. In this example the word "THANKS" (FIG. 2) is seen for celebrating Thanksgiving using for example seeds of Irish moss or grass or any other type of plants, that later on will sprout and grow into Irish moss or grass plants or any other type of plants. In FIG. 2, the "dots" and "cross" signs represent the same or different types of plants. Alternatively, one can create drawings that have pictorial or geometrical meanings.

There would be multiple methods to achieve building the first layer. In a first embodiment, the seeds or seedlings would be implanted manually, or by a robotic method, directly into the soil. They can be implanted directly into the soil according to a pre-specified memorized pattern by the implanting person or automatically memorized pattern by the robot performing the action. They can also be implanted into a schematic made of any material (such as cardboard or plastic or paper, styrofoam or any other suitable material), creating a compact (unitary structure, implantable by itself, residing non-deployed in a small kit, able to be deployed by a single individual, and able to create an identifiable meaningful sign by itself) "solid template" made of such material for group of seeds. The solid template can be flat or can assume the shape of receptacles around the area of seeds or plants deposition/insertion. The solid template pattern can be placed with the seeds/plants on soil bedding and then be covered with soil according to the specifications particular to the plants/seeds.

Figure 3B:
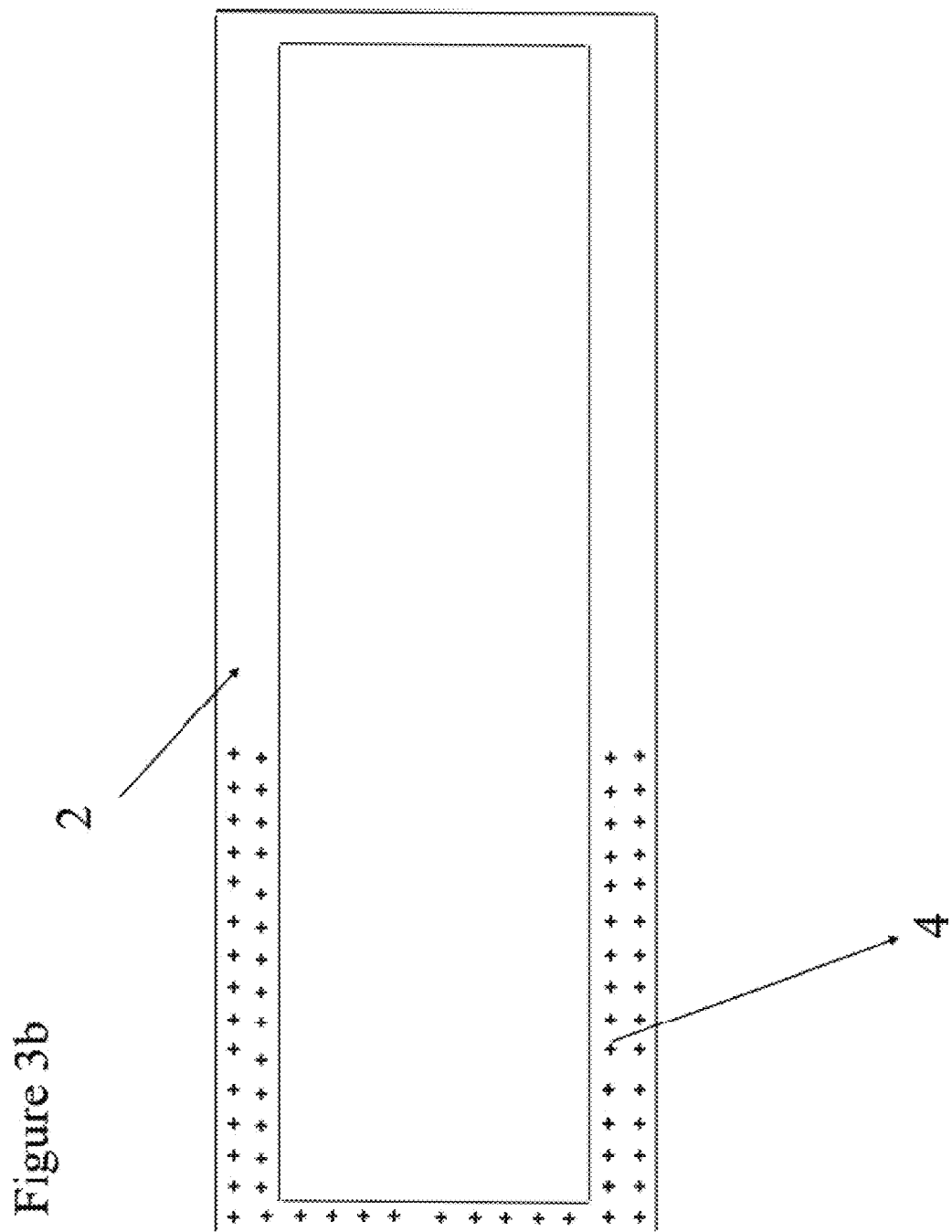

There can be various methods to create such a "solid template." For example one can design a compact grid on a solid sheet (FIG. 1) made of a material that can offer plant sustenance and food when watered (such as dried peat moss), or even non-biological absorbable material, such as various types of cardboard and paper that degrade in the soil, on which one can draw the design imagined by the flo-pat architect (FIG. 2). In this particular example the pattern will be a word surrounded by margins. The word "THANKS" and the margins have different colors, each color indicating that different types of seeds/plants will be placed along the colored grid lines. Three types of seeds/plants will be used in this case. Holes are drilled along these lines. Seeds/plants can be implanted in the "solid template" manually hole by hole, which can be time-consuming, or automatically by a computer-driven machine. Alternatively, one can use various screens with holes ("screen method") perforated in the same exact position as in the "solid template" to perform a fast seeds' deposition by shaking the seeds on top of the screen which is placed on top of the "solid template." As one can see from FIGS. 3a and 3b, each screen is made for each specific type of seed and it matches the respective colors in the "solid template," indicating that deposition of each type of seed will be done separately using separately three types of screens in this particular case. In FIG. 3a, reference numeral 2 refers to a screen made of a compact material with holes or a sheet with holes corresponding to the seed size that needs to be selected, while reference numeral 3 refers to openings for the types of seeds or plants corresponding to the "dot" seeds or plants in FIG. 2. In FIG. 3b, the reference numeral 4 refers to openings for the "cross" type of seeds or plants from FIG. 2. The solid template will be a self-standing object and the user can select his choice of plants, appropriate as size for each particular "solid template."

If done in an automatic way, a computer-driven machine may implant the seeds much faster, according to a memory pattern implanted in the robot's memory. The planting will be done either directly in the "solid template" or using the screen method.

In order to enhance the visual resolution of the pattern, the size of the "solid template" is preferably of the same size or smaller than the distance to the next "solid template" in the pattern, while the latter distance should be larger, for example, than 1.5 multiplied by the distance between plants, seeds or seedlings in the "solid template."

Figure 4:
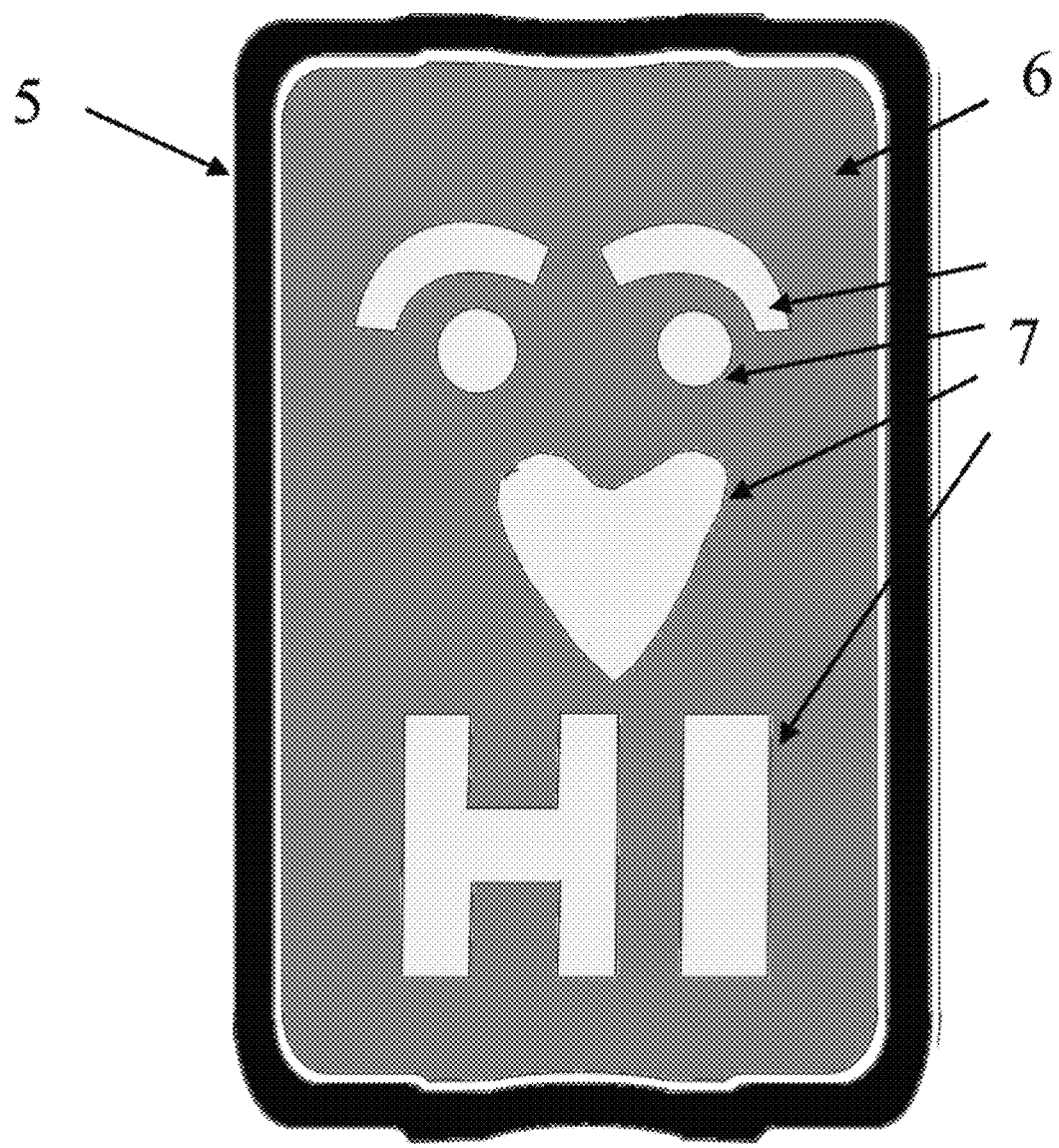
FIG. 4 shows a final result of a flo-pat illustrating a salutation ("Hi") and a face with a heart.

Turning to FIG. 4, there is illustrated a container or pot 5 in which soil 6 is disposed, along with patches of plants 7. Thus, FIG. 4 shows the final result of another flo-pat with a combined meaning, both language and pictorial, including the word "HI" along with a heart and a pair of eyes and eyebrows on top of the heart, mimicking a face and in the same time suggesting a welcome message. Many times, there are numerous random plants left between the significant meaningful segments of this flo-pat, decreasing its visual resolution. For this reason, one may use a layer superimposed over the area between the meaningful segments of the flo-pat; in the subsequent paragraphs, that layer will be called a "mask" (see "mask" represented in the FIGS. 9a and 9b).

Figure 5:
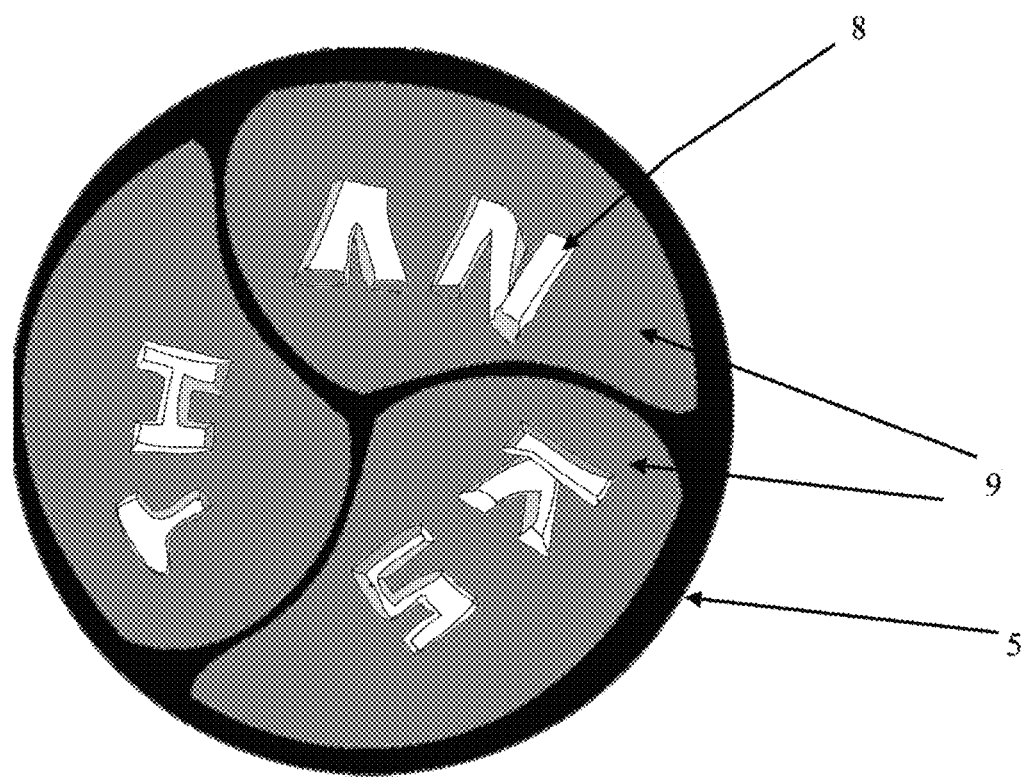
FIG. 5 shows a flo-pat or grass-pat consisting of "planting objects" in the form of letters representing the word "Thank".
Figure 6:
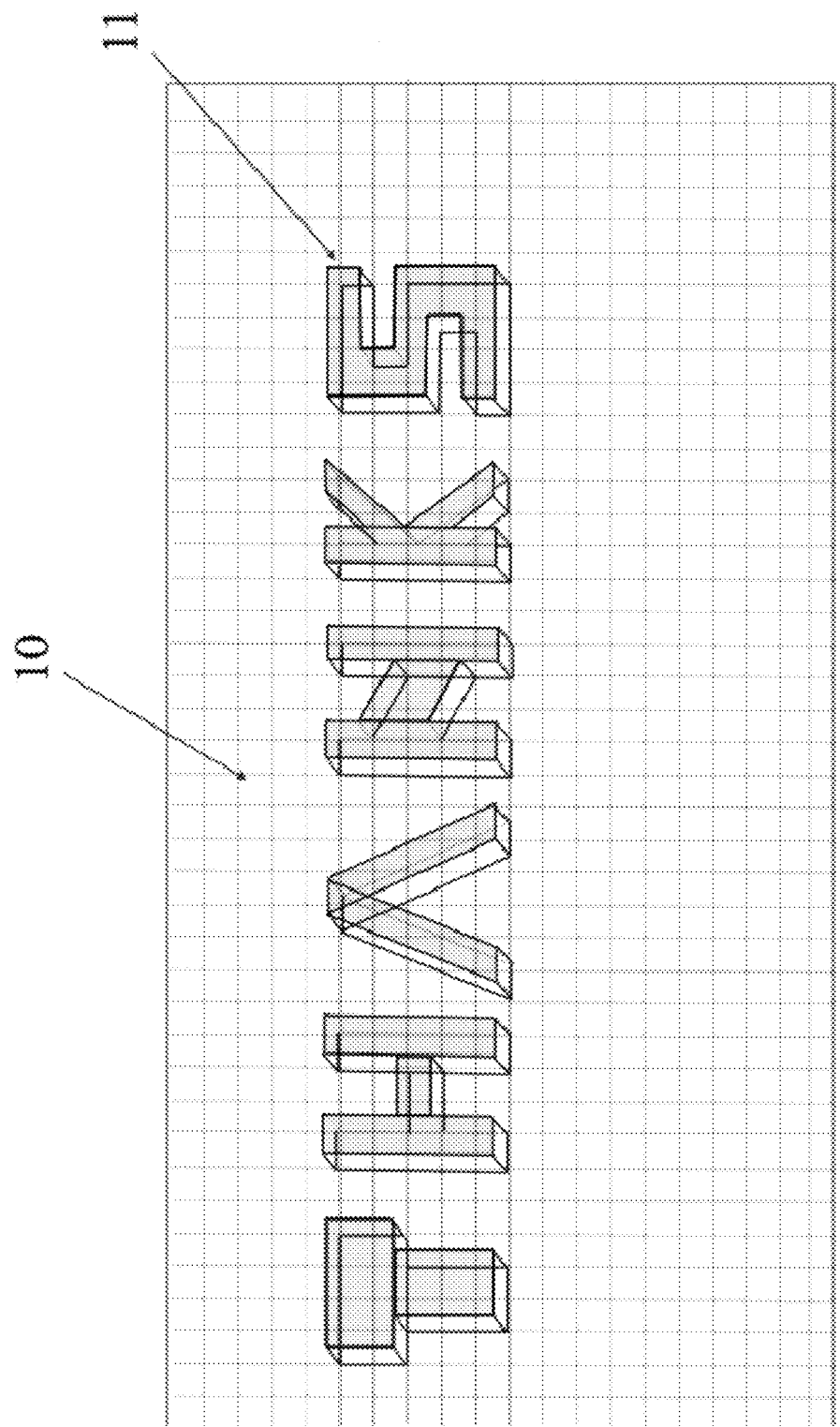
FIG. 6 illustrates "planting objects" in the form of letters, subsequently incorporated into a "solid template". The solid template is eventually perforated allowing the "planting objects" to come in contact with the ground underneath the template.

An example of a second embodiment is illustrated in FIG. 5, which includes a container or pot 5 in which plantings of a type of seeds or seedlings 8 are surrounded by barren soil or soil with a type of seeds or seedling 9 different than the type of seeds or seedlings 8. In this embodiment, large groups of seeds can be placed in compact (unitary structure, implantable by itself, residing non-deployed in a small kit, able to be deployed by a single individual, and able to create an identifiable meaningful sign by itself) "planting objects" with shapes such as letters, geometrical, symbolical, or pictorial shapes or more complex drawings of artistic, geometrical or linguistic meaning. These items can be introduced in "solid templates" (FIG. 6) described above, however with larger holes that can accommodate the "planting objects" or placed directly on the soil bedding in a pattern that the designer has in mind or that was drawn by certain methods directly on the bedding (FIG. 5). Thus, in contrast to FIG. 5, FIG. 6 illustrates a solid template 10, through which planting objects 11 may be disposed to provide a desired design.

For the purposes of this disclosure, "planting objects" can be made of materials that facilitate the seeds germination such as soil with or without fertilizer and ingredients that can increase the consistency, such as flour, starch, glue or any other materials that in small quantities are not noxious to the seeds and/or promote seeds germination. The "planting objects" can be used fresh with a moist soil and ingredients or can be dried out and used later on, while the seeds are kept alive, but in a dormant state.

The "planting objects" can be modeled to reach the shape desired manually, or, alternatively, the material that the object is made of (with seeds mixed inside) could be inserted into preformed hallow recipients that would immediately imprint their shape, or manufactured by any other mechanical automatic method. Alternatively, one can use thin-walled containers made of materials such as cardboard, paper, mesh, peat moss, or any other suitable thin material to incorporate the "planting object." The "planting object" wrapped or not in the thin-walled container will be placed in the "cookie-tray" recipient for better shaping during the manufacturing, and safe transportation and storage. Subsequently, the "planting object" surrounded by the thin-walled container will be taken out of the "cookie-tray" and used as such in creating the flo-pat.

In order to enhance the visual resolution of the pattern, the size of the "planting object" is preferably, for example, of same size or smaller than the distance to the next "planting object" in the pattern, while the latter distance should be larger, for example, than 1.5 multiplied by the distance between plants, seeds or seedlings in the "planting object."

Alternatively, one can use the thin-walled container without using the "cookie-tray" recipient: just fill the thin-walled container that has the shape already imprinted and use the "planting object" made by the thin-walled container and the mix of soil and seeds directly into the "planting object." Also the seeds can be introduced in the thin walled container without using any additional ingredients or soil. For example one can create sheets of seeds (of plants such as grass, moss, flowers) etc., by introducing them in between two sheets of thin-walled material (such as thin paper, perforated thin cardboard, different types of plastic or textile mesh, or layers of compacted peat-moss or any other type of mesh or materials), and later on (after the sheets are introduced in the soil and seeds germinate and sprout into new plants) create pictorial, geometrical or linguistic shapes that can be used in this way to create flo-pats or grass-pats in ensemble with other "platting objects" of same or different shape or color.

A third embodiment of the method concerns the creation of flo-pats or grass-pats by using seedling plants, namely small plants that have germinated and risen above the ground surface. The seeds are planted in compact (latter on used as unitary structures, implantable by themselves, residing non-deployed in a small kit, able to be deployed by a single individual, and able to create an identifiable meaningful sign by themselves) areas of soil according to the specification of the particular seeds. After the seeds germinate they will create a packed blanket of seedling plants, raised above the soil surface.

One can cut areas of soil with seedlings ("seedling cut areas") in the shape desired of pictorial, geometrical or linguistic pattern of portions of this pattern. The seedling cut areas will be deposited initially in a recipient of same shape and later on transplanted into a ground designed to create the flo-pat. The latter ground will have holes dug out that will accommodate the cut areas. Alternatively, these areas of soil and seedlings can be planted on the flat surface and create the flo-pat at a slightly raised level than the initial ground level.

The areas of soil with seedling to be planted in the flo-pat can be cut eventually with a special tool that has an opening with the shape of the area that needs to be cut in a similar way with a cookie-cutter, with sharp edges designed to cut into the soil. After introducing this tool into the soil, the lower edge of this tool already situated deep into the ground will be directed by a manual or automatic remote method from the tool's handle to burrow under the surface area to be cut. Provided that the area to be cut is not large, by pulling up the handle of this tool one can retrieve the entire surface of soil and seedlings without damaging it.

Alternatively, one can germinate the seeds on a special surface (such a porous paper, or any type of material that would allow roots to penetrate through it) mixed with soil and sustenance material. Subsequently, after the seeds germinate and sprout and their roots penetrate through the material for root support, the material can be cut in shapes appropriate for the design of the flo-pat, and the various segments such cut will be transferred and planted in the flo-pat. In a different version, the particular material can be cut in the shapes desired prior to the seeds being planted, and after the seeds germinate, sprout the roots penetrate the material; the various segments will be transplanted to area of planting.

If the soil areas to be transplanted are too large and they are in danger to be damaged if they are retrieved with the above method, then the area to be transplanted may be grown on a solid sheet such as plastic, wood or metal. When the area of seedlings and soil is to be transplanted, one will cut it with a blade or a cookie-cutter type of tool, separate it from the rest of the soil and then slid it down and place it on the designated spot in the flo-pat.

The advantage of the above arrangements in comparison with U.S. Pat. No. 8,033,049 B2 to St. Clair et al. is the fact that each pattern or parts of the pattern are compact, and respect an apriori size relationship with the surrounding areas, allowing for a good visual resolution, while being deployed and mounted by any regular person in small spaces. In order to improve the exact sizing and spatial resolution, the empty space between various areas of the pattern can be covered with sheets of non-biological material, of which material will have edges shaped similarly as the outside shapes of various pattern areas. The details of building and using this type of sheets are listed in item 2) of the disclosure's Objective and detailed in paragraph "Structure of Second Layer."

In addition, the objects involved in the above arrangements are easily transportable and easy to plant into the ground by any person not professional in the art of gardening or landscaping.

In order to create an enduring nature of the first layer, if there will be no walls attached to the unit (such as in a pot), the plant sustaining material in the above arrangements where the plants will be planted in or, alternatively, the plant-replacement and plant-alike materials will need the support of a tri-dimensional network created from thin threads of non-organic or hard organic material (such as cellulose fibers), or from other thin supporting units that can create a structure for this first layer. This network will be eventually affixed on the lower floor of the flo-pat, which will behave as a floor for the unit and hold the plant sustaining material or the plant-alike and plant-replacement materials during the un-packaging process and transport from the container to the place of planting or installment.

Figure 7A:
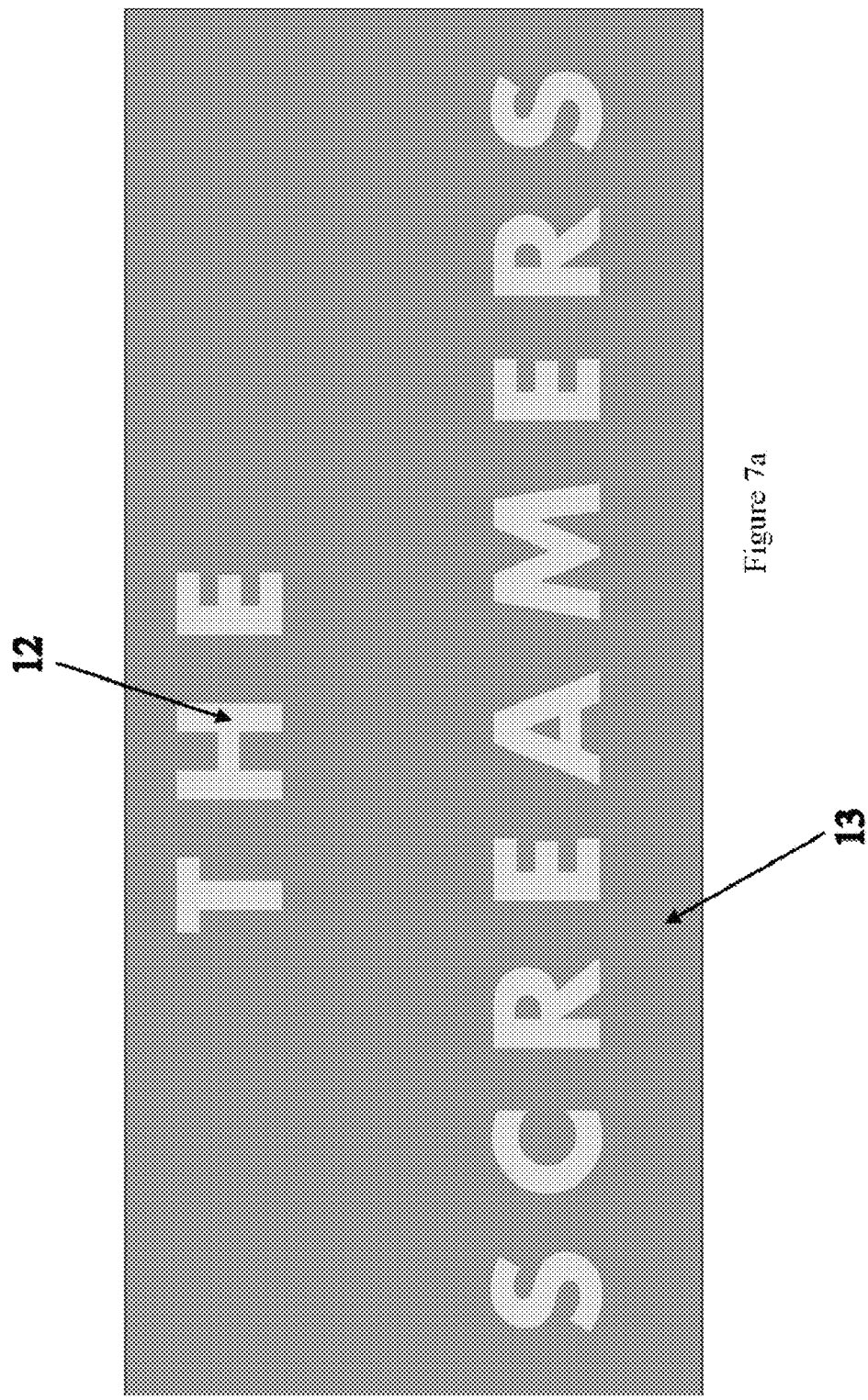
FIG. 7a is a "shade sheet" creating areas of various plant color or density by preventing a full amount of light reaching the plants, according to a predetermined pattern, such as in this design indicating the family name "The Screamers".
Figure 7:
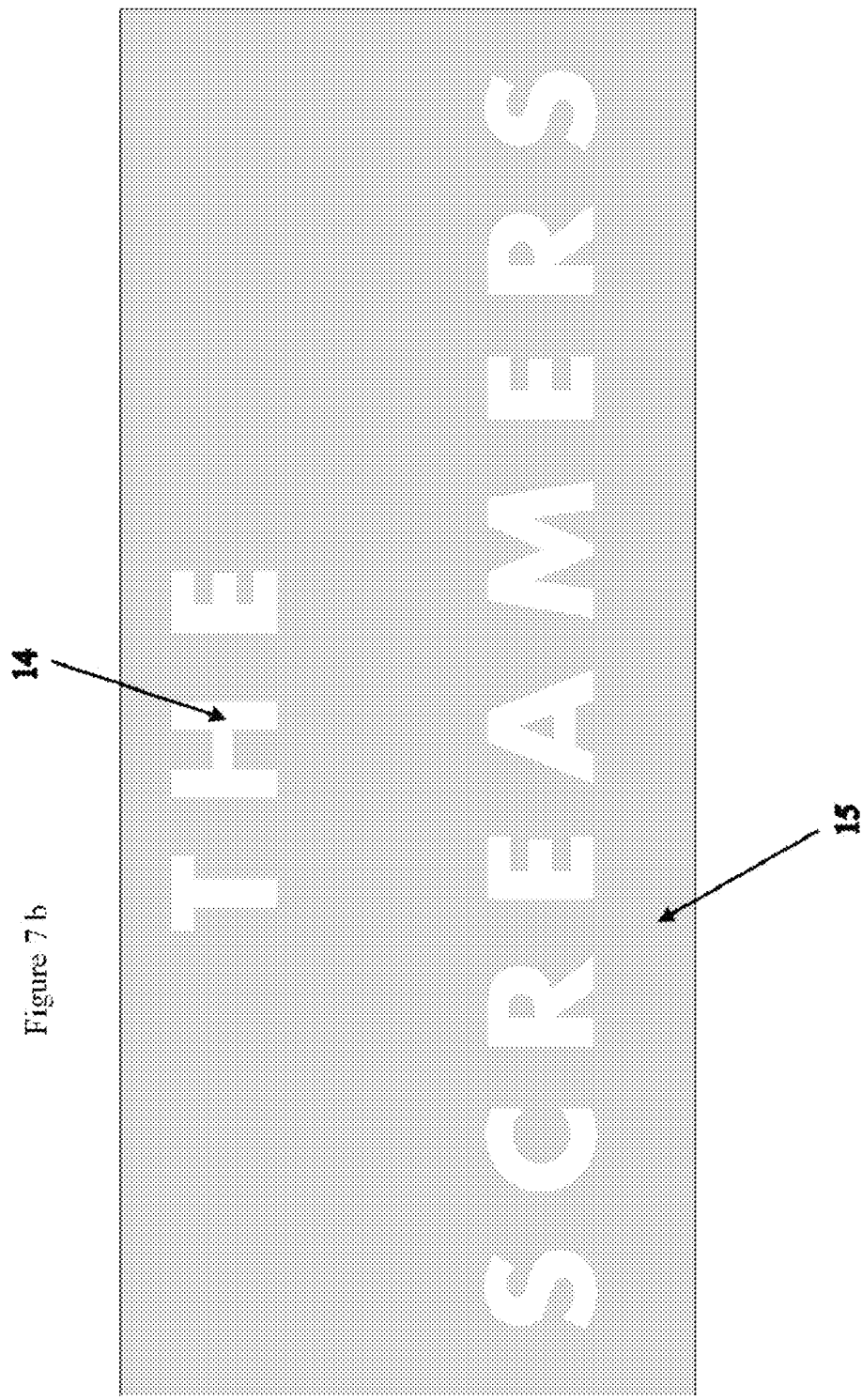
FIG. 7b is a "cutting sheet" creating plant areas of various heights according to a predetermined pattern, such as in this design indicating the family name "The Screamers".

A fourth method can be used to build a flo-pat first layer where one will create various degrees of shade that will totally or partially (in variable degrees) prevent the light from reaching to the plants (FIG. 7a) by using a patterned "shade sheets." In FIG. 7a, for example, an opaque material is identified by reference numeral 13, while a transparent or semi-transparent material is identified by reference numeral 12. In this way, plants such as grass, small dense flowers or any type of plants/flowers that grow uniformly will grow with variable colors and heights corresponding to the degree of shade provided. "Shade sheets" can be built of various materials such as plastic, styrofoam, cardboards, wood, textiles, glass, or fiberglass, etc. with various thickness, colors and porosity in order to allow the complete or partial blockage of light. If the shade is complete no plants will presumably grow at all. The grass in the areas that are not shaded or less shaded will grow normally, or close to normal respectively, in contrast to shaded areas where the grass is absent, just barely grown or of paler shades.

A fifth method can be used to build a flo-pat where one will cut grass, hay, or small dense flowers or any type of plants/flowers that grow uniformly, at various heights as dictated by pre-printed and pre-cut patterns made of sheets of plastic or wood, metal, textiles, glass, fiberglass, and others placed on the carpet of grass, flowers or plants (FIG. 7b). When the time to mow a lawn/plants' blanket has come, one will use the particular sheet ("cutting sheet" 15 made, for example, from a solid material, such as plastic) with a pre-imprinted shape that allows the grass to be cut to stick out through the empty spaces 14 of the sheet 15. Then the grass, small dense flowers or any type of plants/flowers that grow uniformly will be cut in the areas with empty spaces 14 of the sheets. The plants that will be left uncut, or in other instances the cut plants will build the flo-pat in contrast with areas where the plants were cut or uncut respectively (FIG. 8). One can leave the "shade sheet" or "cutting sheet" on the plant layer or remove them depending on the cosmetic/esthetic necessities of the flo-pat/grass-pat to be created. Referring to FIG. 8, for example, reference numeral 16 indicates short grass or other plants, while reference numeral 17 indicates taller grass or other plants.

A sixth method may consist of building live plant patterns by removing natural elements superimposed on a layer of plants. For example, one can remove snow or dry hay or any other elements superimposed on grass/plants/dirt/ground, for example, in an organized compact pattern down to the grass/plant/dirt/ground layer making visible the latter layer in a compact organized pattern. This can be done using a memorized pattern or, for example, using a mask (as described in "Structure of second layer") laid on the layer superimposed on the plants/grass blanket. One can remove the former natural elements from inside or outside the borders of the mask or right along the edges of the mask, manually or by using a machine.

Even more, one can combine the appearance of the grass/plants/dirt/ground below the superimposed natural elements' layer with the mask itself which can be left on top of the upper layer (snow, hay etc.) as seen in "Structure of the second layer" if so desired, or/and with other elements such as lighting elements, rocks, other dried plants (or even paint/liquid plastic materials that subsequently solidify) and other types of elements mounted esthetically along the mask shape on the grass/plants/dirt/ground or on the remaining upper layer of snow, hay, etc.

One can cut or remove plants as described in the fifth to sixth method in an automatic fashion using a robotic machine that can cut/remove natural elements at an indicated height and according to a certain pattern without the need of a "cutting sheet" or mask respectively. The machine can be eventually guided by landmarks implanted in the area where the cutting/removal will take place.

The size of the plants has to be adjusted to the size of the letters or drawings used, in a way to create clear demarcation between letters and/or drawings, for better visual resolution. Larger flo-pat's can use larger size plants or flowers and smaller flo-pat's use smaller size plants and flowers.

One can create flo-pats where no empty spaces are left between areas of the pattern, or one can create flo-pats with possible empty spaces with no continuous blanket of plants, between letters and drawings. The size of the soil granules have to be adjusted, if the latter are to be left uncovered. Larger flo-pat's can use larger size granules while the smaller ones should use only smaller size granules in order to achieve better visual resolution. This is important, since, if used in small flo-pats, larger granules can create empty space in the letters or drawings used, decreasing the clear differentiation between letters and drawings.

Good visual resolution of the plant system is achieved by respecting the following prerequisites:

I. size ratio of plants to distance between distinct areas of the system should be lower, for example, than 1, where distinct areas of the system are areas with plants and no visually noticeable empty spaces.

II. ratio of distances between plants in the same distinct areas and between distinct areas should be lower, for example, than 1/2.

III. size ratio of soil granules reported to distance between distinct areas of the system and between plants situated in the same area should be lower, for example, than 1/4 and 1/2 respectively.

IV. size ratio of empty spaces, covered or not by a cover, to spaces with plants should be greater, for example, than 1/20.

2. Structure of Second Layer

The second layer will be made of surfaces of non-biological layer from the non-biological materials mentioned above that will be clearly demarcating the limits of the plant areas such as masks or cutting-sheets or shade-sheets (option a), or biological material (shoots of greater height than the first layer, of the same or different color/shape/variety) (option b).

Figure 9A:
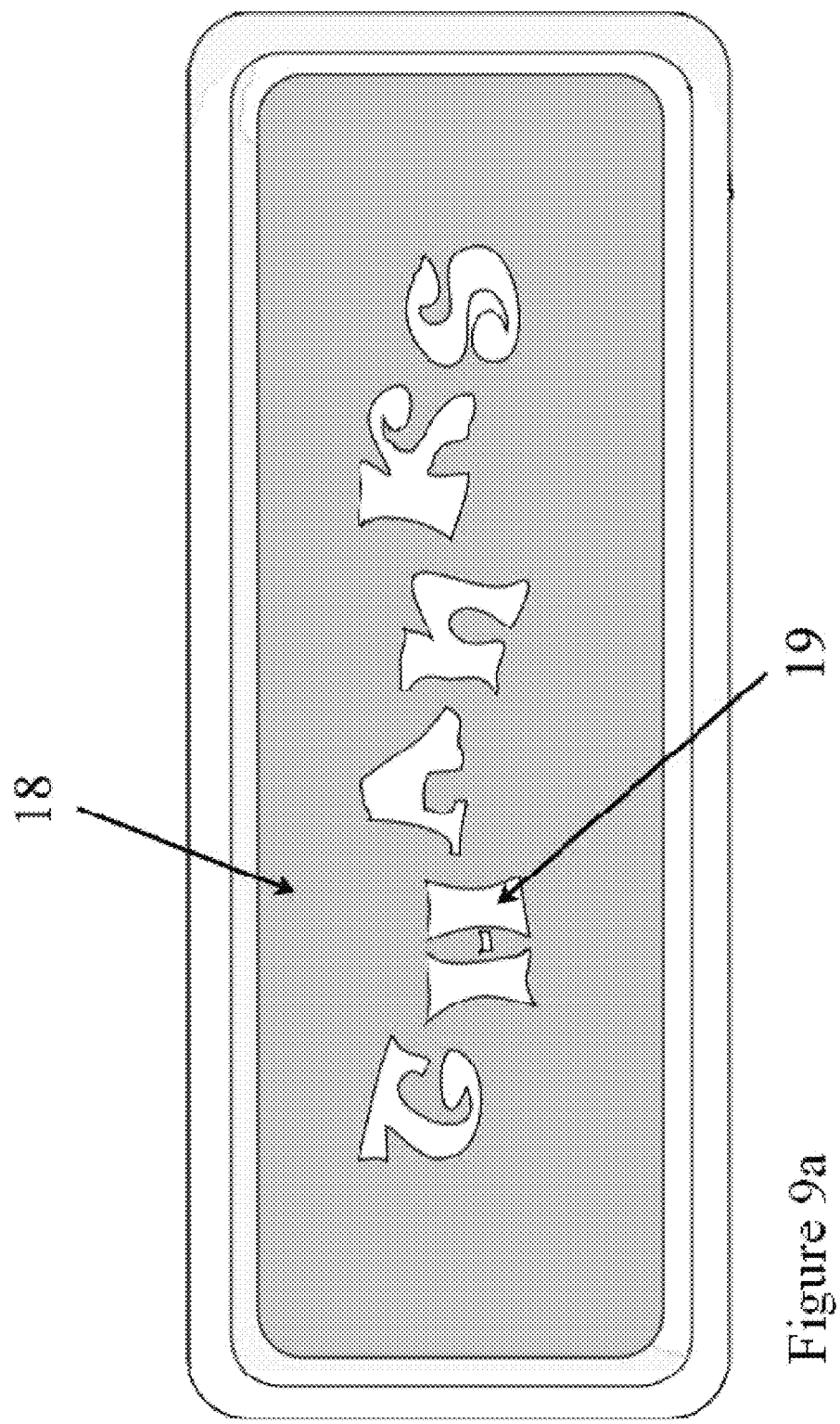
FIG. 9a is a plastic cover ("mask") with empty spaces that allow plants to stick above the cover, creating a design pattern flo-pat.

As to option a, in order to avoid the eventual incidental unwanted plants that may grow in the empty spaces between letters and/or drawings in the case of flow-pat's where empty spaces without plants are chosen to exist, and in order to increase the visual resolution of the arrangement or create distinct meaningful signs, one may cover the empty soil spaces or unwanted plants with a second layer (mask) that allows the plants, seeds, seedlings, barren soil, or plant-replacement material intended to be seen outside the mask, and, at the same time, cover the undesirable empty spaces (FIGS. 9a, 9b). Alternatively, the mask will cover a uniform blanket of plants, and will form the actual design by allowing only segments of the plants blanket to be seen. By clearly demarcating the edges of the plants, seedling, or plant-alike or plant-replacement areas of the pattern, one will increase the visual resolution of the design.

Referring to FIG. 9a, the mask 18 (second layer) can be made of any durable material, such as plastic, styrofoam, steel, metal, wood, ceramic, etc., that can resist water and also other damaging agents, in case the flo-pat is mounted outside. The mask 18 will be molded in such a way that water will drain directly into the holes or empty spaces 19 that allow the plants to grow. The mask can be buried under a thin blanket of soil, gravel, rocks or not. Alternatively, the mask can be left on the surface of the soil, and eventually use materials of colors that blend in with the plants used for the flo-pat. The second layer (mask) can be used indoors, and also outdoors, either in the ground or in flower pots. The mask can be situated at various heights from the cover carpet, so one can see the stems of the plants coming directly out of the soil, or see only the tip of the plants (leaves or flowers).

In addition to increasing the visual resolution, one may use the mask to emphasize the beauty of solitary flowers, plants, seedlings, or trees situated outside but in proximity to the flo-pat objects, with their stems traversing the mask. A mask will also be used to mark the limits where one will lay on the soil the seeds that will later grow into plants surrounded by the mask or will grow free after the mask is removed.

Referring to FIG. 9b, this method may also be used to plant a living plant, flower, seedling, shrub or tree 21 through an orifice 19 in the "mask" 18. The orifice allowing the stem will be small (FIG. 9b), smaller that the segment of plant with leaves and flowers and will allow to pass only the root and the stem in this order, not the leaves or flowers. Plants, flowers, trees and shrubs with roots will have their roots and stems inserted into the orifice. The area under the particular orifice will be filled with soil or plant sustaining material eventually only after the roots and stems will be passed through the orifice. Other plants 20 may grow through other holes or empty spaces 19 in the mask.

Alternatively, as a second method, a cut will be made in the "mask" edges. Two partial flaps are in this way being separated by the cut. After the plant, flower, tree or shrub is being planted, the mask will be applied over the flo-pat by opening the two flaps around the particular cut to allow the stem to slide through the mask.

Figure 10:
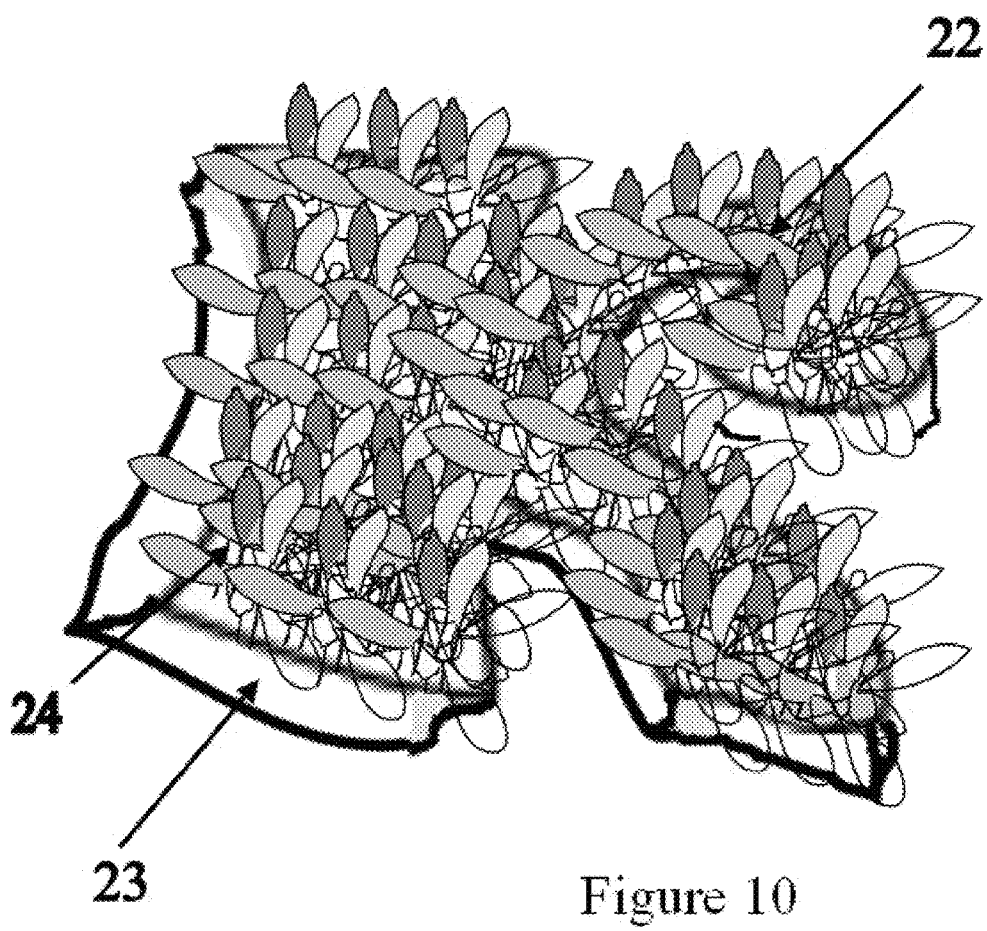
FIG. 10 is a vertical mask similar with a fence made of material (synthetic or natural) preferably plastic surrounds similar or varied types of plants/flowers in a shape with a purposeful meaning such as the letter "K" in this figure.

Alternatively, as option b, the second layer can be represented by a layer of plants that reach above or below the first layer (higher or lower dimension on the vertical X axis in an XYZ space), while being situated along an area immediately adjacent to the areas of the flo-pat described in the "Structure of first layer" (immediately adjacent in the horizontal YZ plane in an XYZ space). This will contribute to a better resolution of the flo-pat. Another artificial element to enhance the visual resolution of the Flo-pat/grass-pat compact arrangement is a "mask" oriented vertically 23 surrounding the plants 22 similarly with a fence as represented in FIG. 10. In FIG. 10, the plant stems inserted into the soil are identified by reference numeral 24. In a similar way one can combine this latter type of containers in an interlocking manner similar with a Lego game.

3. Multilayer Structure

One can continue building on the repetition of the first and second layer. For example one can use the mask as described as option a in paragraph "Structure of second layer" or parts of it as a support for new layers of plants. The plants will be planted in soil deposited in receptacles. The receptacles will be provided at the external surface of their bottom wall with prongs or other type of connectors (upper connectors) that will be fit with reciprocal connectors (lower connectors) situated on top of the mask. By fitting the upper with the lower connectors one will be able to affix the receptacles on top of the mask, creating the possibility of a second layer of plants. One can use a mask for same purposes as above, to increase the visual resolution of the second layer of plants. In this way one can repeat a multitude times the plants-mask-receptacles/plants-mask-receptacles/plants-mask . . . repetition (or layer1-layer2-layer1-layer2-layer1-layer2 . . . , where plants or receptacles/plants are layer1 and mask is layer2 to create a multilayer tri-dimensional flo-pat structure.

In a similar fashion, one can create a multilayer structure of plants using the method described in option b in paragraph "Structure of second layer." This sub-paragraph taught that one can create a pattern by cutting a uniform layer of vegetation (such as grass or hay for example) in certain area of the layer at a different height, creating in this way a visible pattern with two layers of different height. One can repeat the same process using the as a start each resulting layer, with a final result being a tri-dimensional structure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

A number of embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A horticultural design kit comprising: a framework presenting a plurality of spaces in an organized pattern representing a letter, a multiplicity of letters or a pictorial design, said plurality of spaces being adapted to receive a plurality of at least one of plants, plant replacement materials, seedlings, and seeds disposed in said organized pattern for placement for growth in a plant sustainable medium,
   wherein the framework includes at least one shade sheet, said shade sheet being formed of a non-organic material having at least a first portion and a second portion, wherein the first portion and second portion have differing physical characteristics selected from among the group consisting of opacity, thickness and color such that said first and second portions are adapted to permit the passage of different levels of light to penetrate to the level of plants disposed subjacent the shade sheet.

2. The horticultural design kit of claim 1 wherein the framework includes a grid of a solid non-biodegradable material including the plurality of spaces adapted to receive said plants, plant-replacement materials, seedlings, and seeds for disposition in the organized pattern within said plant sustainable medium.

3. The horticultural design kit of claim 1 wherein the framework includes at least one screen, the plurality of spaces including perforations in said screen, said perforations forming at least a portion of said organized pattern representing a letter, a multiplicity of letters or a pictorial design, said perforations adapted to allow the passage of seeds therethrough for disposition in said plant sustainable medium in said at least a portion of said organized pattern.

4. The horticultural design kit of claim 3 wherein the framework includes a plurality of screens, each said screen including perforations forming respective portions of said organized pattern.

5. The horticultural design kit of claim 1 further including a moldable planting object formed of a second plant sustainable medium and including a plurality of seeds disposed within said second plant sustainable medium.

6. The horticultural design kit of claim 1 further including said at least one of a plurality of at least one of plants, plant replacement materials, seedlings, and seeds disposed in said organized pattern for placement for growth in the plant sustainable medium.

7. The horticultural design kit of claim 1 wherein the framework includes a porous material adapted to allow germination and the penetration of roots, at least one seed being fixed with said porous material, said porous material being adapted to be cut to form at least a portion of said organized pattern.

8. The horticultural design kit of claim 1 wherein the framework includes at least one cutting sheet, said cutting sheet being formed of a non-organic material and including at least one open space, said open space adapted to allow the penetration of at least one plant, whereby said at least one plant penetrating said cutting sheet through said open space may be cut.

9. The horticultural design kit of claim 1 wherein the framework includes at least one cover, said cover being formed of at least one material that inhibits plant growth.

10. A method of creating an organized pattern of at least one of plants, plant replacement materials, seedlings, and seeds for placement for growth in soil, the method comprising:
providing a plurality of at least one of plants, plant replacement materials, seedlings, and seeds,
providing a framework presenting an organized pattern representing a letter, a multiplicity of letters or a pictorial design,
disposing said plurality of at least one of plants, plant replacement materials, seedlings, and seeds within a plant sustainable medium according to said framework,
wherein providing a framework includes providing a shade sheet formed of a non-organic material having at least a first portion and a second portion, wherein the first portion and second portion have differing physical characteristics selected from among the group consisting of opacity, thickness and color such that said first and second portions are adapted to permit the passage of different amounts of light to penetrate therethrough, and the disposing step includes disposing the shade sheet above plants disposed in said plant sustaining medium.

11. The method of claim 10 wherein the step of providing a framework includes providing a grid of a solid non-biodegradable material patterned with openings forming said organized pattern, and said disposing step includes disposing said grid on said plant sustainable medium and planting said at least one of plants, plant replacement material, seedlings, and seeds through said openings into said medium.

12. The method of claim 10 wherein said step of providing a framework includes providing at least one screen including perforations disposed in at least a portion of the organized pattern, and the disposing step includes situating the screen above said plant sustainable medium and dropping a plurality of seeds through said perforations onto said plant sustainable medium according to said portion of the organized pattern.

13. The method of claim 10 further including forming a moldable planting object containing a plurality of seeds and disposing same with said framework.

14. The method of claim 10 wherein providing a framework includes providing seeds supported on a porous material that allows passage of roots and germination of said seeds, and cutting said porous material into a desired shape, and said disposing step includes disposing said porous material cut into a desired shape onto said plant sustaining medium.

15. The method of claim 10 wherein providing a framework includes providing a cutting sheet of non-organic material having one or a multitude of perforated spaces and the disposing step includes placing said cutting sheet over plants or seedlings and cutting plants extending through said perforated spaces.

16. The method of claim 10 wherein providing a framework includes at least one cover, said cover being formed of at least one material, said material being one of steel, wood, plastic, paper or cardboard, textile, fiberglass, glass or other non-organic material that inhibits the growth of plants disposed in a plant sustaining medium, said cover including spaces, said spaces being sized and adapted to allow passage of a root and stem of a plant or a multitude or roots and stems of plants, and the disposing step includes disposing the cover above plants disposed in said plant sustaining medium and allowing them to grow through said spaces.

* * * * *